(12) United States Patent
Nervig

(10) Patent No.: US 8,320,441 B2
(45) Date of Patent: Nov. 27, 2012

(54) EFFICIENT HIGH PERFORMANCE DEMODULATION OF LOW BT VALUE GAUSSIAN MINIMUM SHIFT KEYING INCORPORATING TURBO EQUALIZATION

(75) Inventor: Alan T. Nervig, Melbourne Beach, FL (US)

(73) Assignee: Harris Corporation, Melbourne, FL (US)

( * ) Notice: Subject to any disclaimer, the term of this patent is extended or adjusted under 35 U.S.C. 154(b) by 300 days.

(21) Appl. No.: 12/889,960

(22) Filed: Sep. 24, 2010

(65) Prior Publication Data

US 2012/0076192 A1    Mar. 29, 2012

(51) Int. Cl.
*H03K 9/06*      (2006.01)
*H03H 7/30*      (2006.01)
(52) U.S. Cl. .................... 375/232; 375/322; 375/336
(58) Field of Classification Search .................. None
See application file for complete search history.

(56) References Cited

U.S. PATENT DOCUMENTS

| | | | |
|---|---|---|---|
| 6,993,070 B1 | 1/2006 | Berthet et al. | |
| 7,492,839 B2* | 2/2009 | Varma et al. | 375/341 |
| 8,126,085 B2* | 2/2012 | Krupka et al. | 375/317 |
| 2008/0226003 A1* | 9/2008 | Chevalier et al. | 375/354 |
| 2009/0074039 A1* | 3/2009 | Miller | 375/150 |
| 2010/0016012 A1* | 1/2010 | Valadon | 455/550.1 |

OTHER PUBLICATIONS

Laurent, P.A., "Exact and Approximate Construction of Digital Phase Modulations by Superposition of Amplitude Modulated Pulses (AMP)", IEEE Trans. Commun., vol. Com-34, No. 2, Feb. 1986, pp. 150-160.
Abbey, D.D., et al., "A Simple Coherent Receiver for Frequency-Hopped Pulse-Driven GMSK", IEEE 0-7803-5538-5/99, pp. 286-290, 1999.
Koch, W., et al., "Optimum and Sub-Optimum Detection of Coded Data Distrurbed by Time-Varying Intersymbol Interference", IEEE Global Conference on Telecommunications, 199, vol. 3, pp. 1679-1684, Dec. 1990.
Ungergboeck, G., "Adaptive Maximum Lileklihood Receiver for Carrier Modulated Data Transmission Systems", IEEE Transaction on Commun., vol. COM-22, pp. 624-635, May 1974.

* cited by examiner

*Primary Examiner* — David Ometz
*Assistant Examiner* — Bahman Badipour
(74) *Attorney, Agent, or Firm* — Fox Rothschild, LLP; Robert J. Sacco

(57) ABSTRACT

Systems (600) and methods (100) for demodulating a Gaussian Filtered Minimum Shift Keyed (GMSK) signal. The GMSK signal is defined in a transmitted symbol domain where each symbol is given by a product of a current data bit and a previous data bit. The GMSK signal is converted from the transmitted symbol domain to a data symbol domain. The conversion is achieved by approximating filtered complex output signals that would be produced by matched filters having filter shapes corresponding to pulses used in terms of a Laurent expansion. Subsequent to the convention of the GMSK signal, a trellis equalization of the GMSK signal is performed exclusively in the data symbol domain based on the terms of the Laurent expansion.

22 Claims, 7 Drawing Sheets

EFFICIENT HIGH PERFORMANCE DEMODULATION OF LOW BT VALUE GAUSSIAN MINIMUM SHIFT KEYING INCORPORATING TURBO EQUALIZATION

BACKGROUND OF THE INVENTION

1. Statement of the Technical Field

The invention concerns methods and systems for demodulating Gaussian Filtered Minimum Shift Keyed (GMSK) signals, and more particularly concerns methods for demodulating GMSK signals having a low Bit period of Transmission (BT) value in receiver systems incorporating turbo equalization.

2. Description of the Related Art

The Radio Frequency (RF) bandwidth of a GMSK signal is advantageously controlled by using a Gaussian filter to shape the digital data stream prior to the digital data stream being applied to a phase modulator. GMSK is a type of phase modulation where the transmitted signal is given by the following mathematic equation (1).

$$s(t,\alpha) = \exp(i\psi(t,\alpha)) \tag{1}$$

where t is the time. $\alpha$ is a vector of values defined by the following mathematical equation (2).

$$\alpha_n = d_n d_{n-1} \tag{2}$$

where $d_n$ is the $n^{th}$ data symbol with a value of positive one (+1) or negative one (−1). $\psi(t, \alpha)$ is defined by the following mathematical equation (3).

$$\psi(t, \alpha) = \frac{\pi}{2} \sum_n \alpha_n q(t - nT) \tag{3}$$

where q(t) is defined by the following mathematical equation (4).

$$q(t) = \int_{-\infty}^{t} g(\tau) d\tau \tag{4}$$

where $g(\tau)$ is define by the following mathematical equation (5).

$$g(t) = h(t) * rect\left(\frac{t}{T}\right) \tag{5}$$

where * represents a convolution operation and h(t) is defined by the following mathematical equation (6).

$$h(t) = \frac{\exp\left(\frac{-t^2}{2\delta T^2}\right)}{\sqrt{2\pi}\,\delta T} \tag{6}$$

where $\delta$ is defined by the following mathematical equation (7).

$$\delta = \frac{\sqrt{\ln(2)}}{2\pi BT} \tag{7}$$

It is well known that sharper filters reduce unwanted sidelobes in the RF spectrum associated with GMSK signals, but also increases Inter-Symbol-Interference (ISI). Increased ISI causes symbol detection to be more difficult.

Error correcting codes do not function well where a high level of ISI is present in the communication channel. Accordingly, a receiver system can be designed to compensate for such channel effects prior to decoding. Such methods of compensation are typically referred to as channel equalization. In a system employing channel equalization, an equalizer is used to reduce the effects of ISI and other dispersive channel effects so as to increase the possibility of making correct decisions regarding which symbols have been received. Various methods for performing channel equalization are well known in the art, including the method known as turbo equalization.

It is known in the art that any constant amplitude binary phase modulation can be decomposed as a sum of a finite number of Pulse-Amplitude Modulated (PAM) signal components. See P. A. Laurent, "Exact and approximate construction of digital phase modulations by superposition of amplitude modulated pulses", IEEE Trans. Commun., vol. COMM-34 pp 150-160, February 1986. Such decomposition is sometimes referred to herein as a Laurent expansion. The terms of a Laurent expansion are signals in time, designated by k, that are given by the following mathematical equation (8).

$$\sum_n b_{k,n} c_k(t - nT). \tag{8}$$

where $c_k(t)$ represents pulses of the signals k.

An advantage of the decomposition or Laurent expansion is that, for some BT values, each signals k can be approximated using only one optimized amplitude modulated waveform (named a "main pulse"). For half-integer values of the modulation index, the main pulse is the first component of the decomposition or Laurent expansion, making computation of these functions particularly simple. These properties reduce significantly the inherent complexity of interpreting digital phase modulation, and therefore are especially useful for implementing demodulators.

High performance yet efficient trellis based demodulation, that can be represented using a single component of the above-referenced decomposition, have already been designed for GMSK applications where the value of BT is relatively high (BT≧0.25). For example, U.S. Pat. No. 6,993,070 to Berthet et al. discloses a turbo demodulation procedure for GMSK, but it is not applicable to GMSK with low BT values. Comparable algorithms for GMSK with significantly lower BT values that need to be represented by multiple terms in the Laurent expansion have not yet been developed. Current state of the art algorithms require the manipulation and book keeping of complex data values, and require separate data paths for odd and even samples. Furthermore, the trellis states are defined in terms of differentially encoded transmitted bits rather than actual data bits, making implementation of turbo equalization difficult. For example, See D. D. Abbey, R. R. Rhodes, "A simple coherent receiver for frequency-hopped pulse-driven GMSK", IEEE 0-7803-5538-5/99, pp. 286-290, 1999.

GMSK is the modulation of choice for communications in space and for other applications. However, due to implementation concerns, GMSK has generally been considered only for use with BT values greater than one quarter (BT>0.25). Increases in data rates with reductions in transmission power are possible if suitable methods for implementation of lower BT GMSK can be developed. Such implementations are potentially very useful for systems requiring constant modulus transmission to reduce cost, that also need to minimize transmission power, for either cost or capacity concerns, but that can afford some degree of complexity at the receiver.

SUMMARY OF THE INVENTION

Embodiments of the present invention concern implementing systems and methods for demodulating a Gaussian Filtered Minimum Shift Keyed (GMSK) signal. The methods generally involve receiving a Complex Data Signal (CDS). The CDS can be defined in a transmitted symbol domain where each symbol is given by a product of a current data bit and a previous data bit. The GMSK signal is converted from the transmitted symbol domain to a data symbol domain by approximating a plurality of filtered complex output signals that would be produced by a plurality of matched filters having filter shapes corresponding to a predetermined number of pulses used in terms of a Laurent expansion. Thereafter, a trellis equalization of the GMSK signal is performed exclusively in the data symbol domain based on the terms of the Laurent expansion. The trellis equalization can use the same trellis transition metrics at each of a plurality of trellis transitions for both odd and even numbered data bits. The trellis equalization can also use a soft decision viterbi equalizer algorithm.

The domain of the GMSK signal is converted by filtering the GMSK signal using a first matched filter having a filter shape corresponding to a first pulse used in a first term of the Laurent expansion. Thereafter, a phase rotation is performed on complex data samples representing a first complex output signal from the first matched filter to produce a negative ninety (−90) degree phase rotation for each data sample relative to a previous sample. A scaling and delaying function is then performed exclusively on a real number portion of a complex data sample to obtain an approximation of at least a second filtered complex output signal that would be produced by a second matched filter having a filter shape corresponding to a second pulse used in a second term of the Laurent expansion.

DESCRIPTION OF THE DRAWINGS

Embodiments will be described with reference to the following drawing figures, in which like numerals represent like items throughout the figures, and in which.

DETAILED DESCRIPTION

Figure 1:
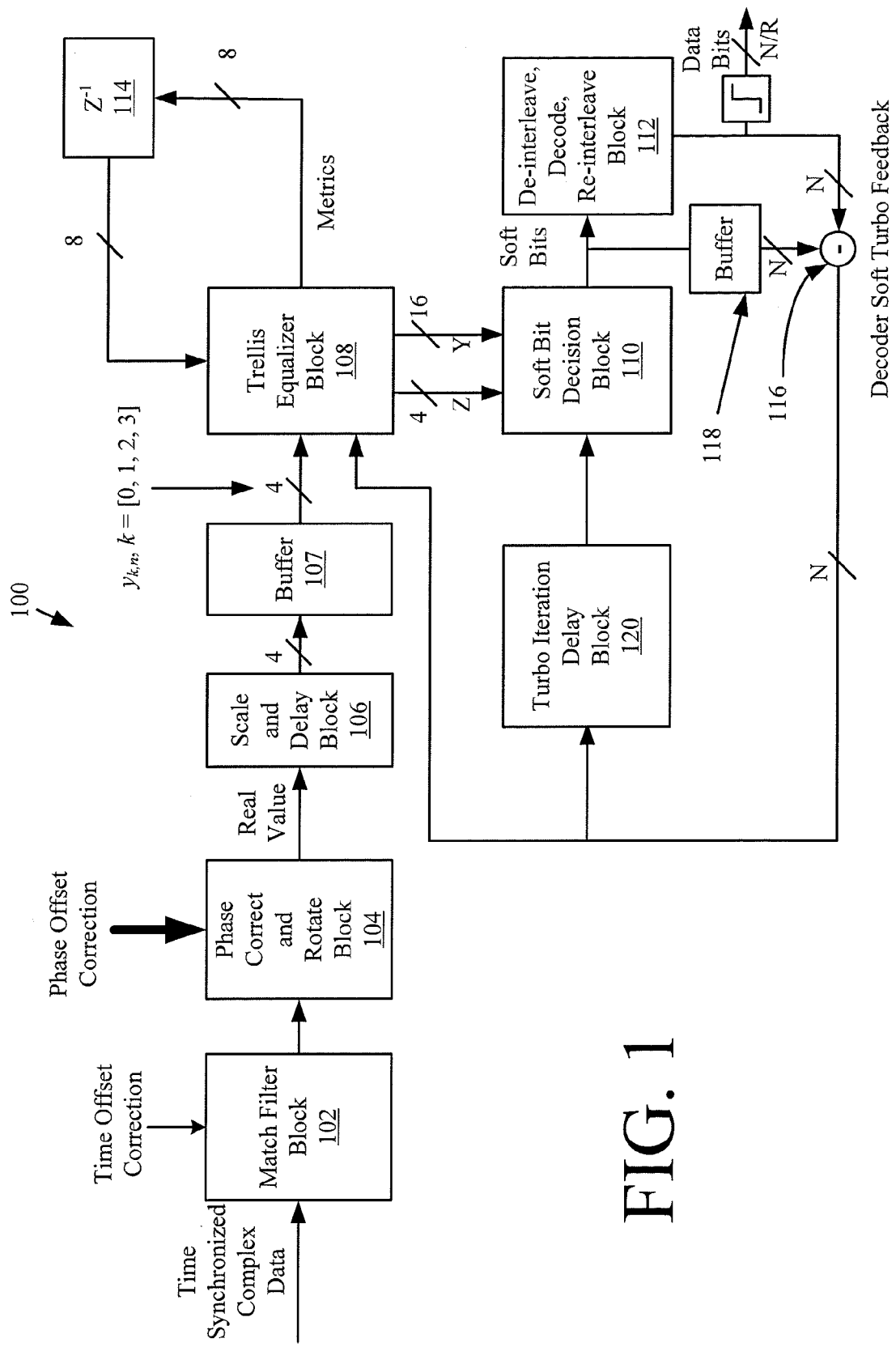
FIG. 1 is an overview block diagram of a trellis demodulation/equalization method.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

For convenience, the inventive concepts herein shall be described in relation to an eight (8) state trellis modem. This size is based on choosing a minimum trellis size that gives near ideal performance for BT values equal to one sixth (BT=⅙). Still, it should be understood that the inventive concept is not limited to eight (8) state trellis modems or to a particular BT value. Instead, the inventive arrangements can be applied for use with other BT values, both smaller and larger. Smaller BT values may require a larger trellis.

System Overview

It is well known that a constant amplitude binary phase modulation can be decomposed as a sum of a finite number of PAM signal components. See P. A. Laurent, "Exact and approximate construction of digital phase modulations by superposition of amplitude modulated pulses", *IEEE Trans. Commun.*, vol. COMM-34 pp 150-160, February 1986, the entirety of which is incorporated herein by reference. Such decomposition is sometimes referred to herein as a Laurent expansion. The technique described in the Laurent paper is utilized in a demodulator described in the following paper: D. D. Abbey, R. R. Rhodes, "A simple coherent receiver for frequency-hopped pulse-driven GMSK", IEEE 0-7803-

5538-5/99, pp. 286-290, 1999 (hereinafter "the Abbey Rhodes paper"). The demodulator described in the Abbey Rhodes paper describes an arrangement in which four (4) terms of a Laurent expansion are used to represent the GMSK data. The demodulation/equalization processing in Abbey Rhodes paper is generally performed in the transmitted symbol domain using both real and imaginary numbers. Accordingly, it will be appreciated that signal in the Abbey Rhodes approach is represented in the complex data plane. This approach makes for a relatively difficult implementation with substantial complexity.

Because the demodulation system described in the Abbey Rhodes paper operates in the transmitted symbol domain, all processing will be different for odd and even numbered data symbols. The data symbols are derived from the data bits of a signal through Forward Error Correction (FEC) coding performed by an FEC decoder. FEC coding is well known in the art, and therefore will not be described herein. This requires twice as much processing circuitry, and logic capable of switching signals between the two (2) different types of processing circuitry based on a determination of whether a data symbol is odd numbered or even numbered.

In the Abbey Rhodes paper, there is no method presented for generating soft decisions. However, the processing described in the Abbey Rhodes paper could be altered to generate soft decisions in the transmitted symbol domain. In order to generate soft decisions from the equalizer disclosed in the Abbey Rhodes paper, a transition needs to be performed. The transition generally involves transitioning from the transmitted symbol domain, in which an equalizer operates, to the data symbol domain, in which the FEC decoder operates. This added layer of complexity involves use of several hyperbolic tangent functions and logarithmic functions, both of which are known to be very processing intensive. This processing will also involve the use of several additional multiplication functions. Moreover, if turbo-equalization were desired in the system described in the Abbey Rhodes paper, it would inevitably be necessary to transition back from the data symbol domain to the transmitted symbol domain to complete the signal processing loop again necessitating the user of hyperbolic tangent functions and logarithmic functions as well as additional multiplication functions. This is due to the fact that conventional decoders generally operate in the data symbol domain and the equalizer disclosed in the Abbey Rhodes paper operates in the transmitted symbol domain.

In contrast, the present invention concerns a system and method for efficient, high performance demodulation for low BT GMSK, that allows for incorporation of turbo-equalization. The process includes the step of performing a phase rotation upon the complex GMSK data and thereafter processing only the real part of the result. In one embodiment, the phase rotation is performed by multiplying each digital data sample by $i^{-n}$, where n is the number assigned to a particular sample. The phase rotation process and subsequent selection of only the real part of the data essentially collapses the digital data from the complex plane to the real axis and greatly simplifies subsequent processing with no loss in performance. If the BT values are equal to or greater than one sixth (BT$\geq$1/6), then four (4) Laurent terms are generally needed in order to adequately represent the complex GMSK data signal. Notably, if the BT values are less than one sixth (BT<1/6), then more than four (>4) Laurent terms are generally needed in order to adequately represent the complex GMSK data signal. A scaling and delaying process is used to estimate the second, third and fourth Laurent pulses based on the first Laurent pulse. This allows subsequent demodulation and equalization processing to be performed exclusively in the data domain, using only real numbers, thereby greatly reducing complexity.

Referring now to FIG. 1, there is shown an overview block diagram of an efficient, high performance, demodulation method for low BT GMSK, that incorporates turbo-equalization. More particularly, the method presents a trellis for low BT GMSK in terms of encoded data that allows for a greatly simplified implementation of turbo equalization. The method eliminates the need to process complex data and also eliminates the need to maintain separate processing paths for real and complex data. The trellis, also has significant advantages when combined with a single matched filter concept and Maximum A Posteriori hypothesis (MAP) approximation concept discussed below. For example, the trellis can be used to generate near MAP trellis demodulation for BT values equal to one sixth (BT=1/6) that uses only thirteen (13) multiples per symbol and that requires no trellis trace back bookkeeping. In this regard, it should be understood that eight (8) multiplications are performed at the match filter, two (2) multiplications are performed for phase correction, and N−1 multiplications are performed for N components of the Laurent expansion. A larger N value may be required when the BT values are less than one sixth (BT<1/6).

It should be appreciated that the system shown in FIG. 1 can be used with any decoder capable of returning soft transmit symbols to the trellis equalizer. For example, suitable decoders for this purpose can include without limitation decoders used for Low Density Parity Check (LDPC) codes and turbo codes. The design is advantageous because it is simpler than previously described designs, and because of its simplicity, it makes simple the implementation of iterative (turbo) processing between the equalizer and decoder.

Referring once again to FIG. 1, a modem 100 is presented for the case of an eight (8) state trellis equalizer. As noted below in relation to mathematical equation (27), the eight (8) states refers to the fact that the trellis equalizer looks back three (3) steps to make a decision (i.e., $2^3$=8 states). Although the present invention is described in relation to an eight (8) state trellis equalizer, the present invention is not limited in this regard. The trellis equalizer can have any number of states selected in accordance with a particular application. In this regard, it should be understood that an eight (8) state trellis equalizer is suitable for BT values equal to or greater than one sixth (BT$\geq$1/6).

Figure 6:
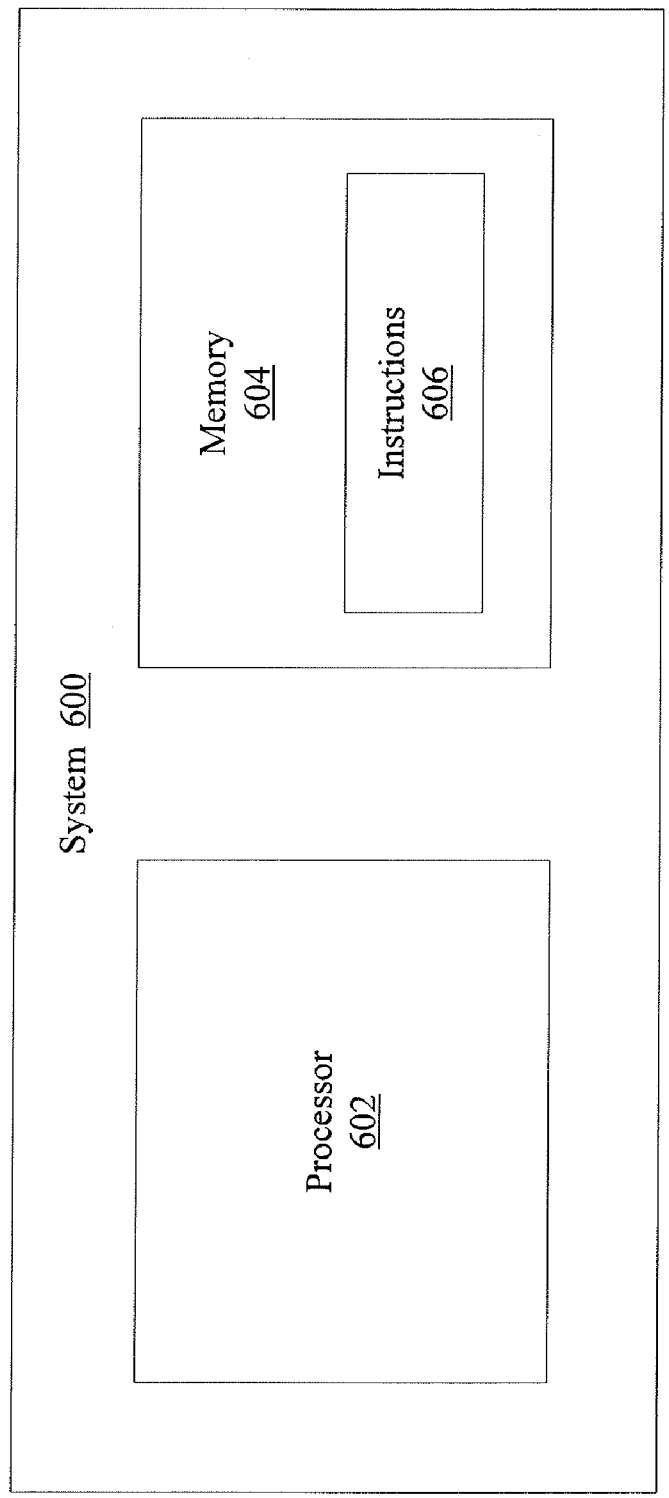
FIG. 6 is a block diagram of a system configured to perform the operations of the modem shown in FIG. 1.
Figure 7:
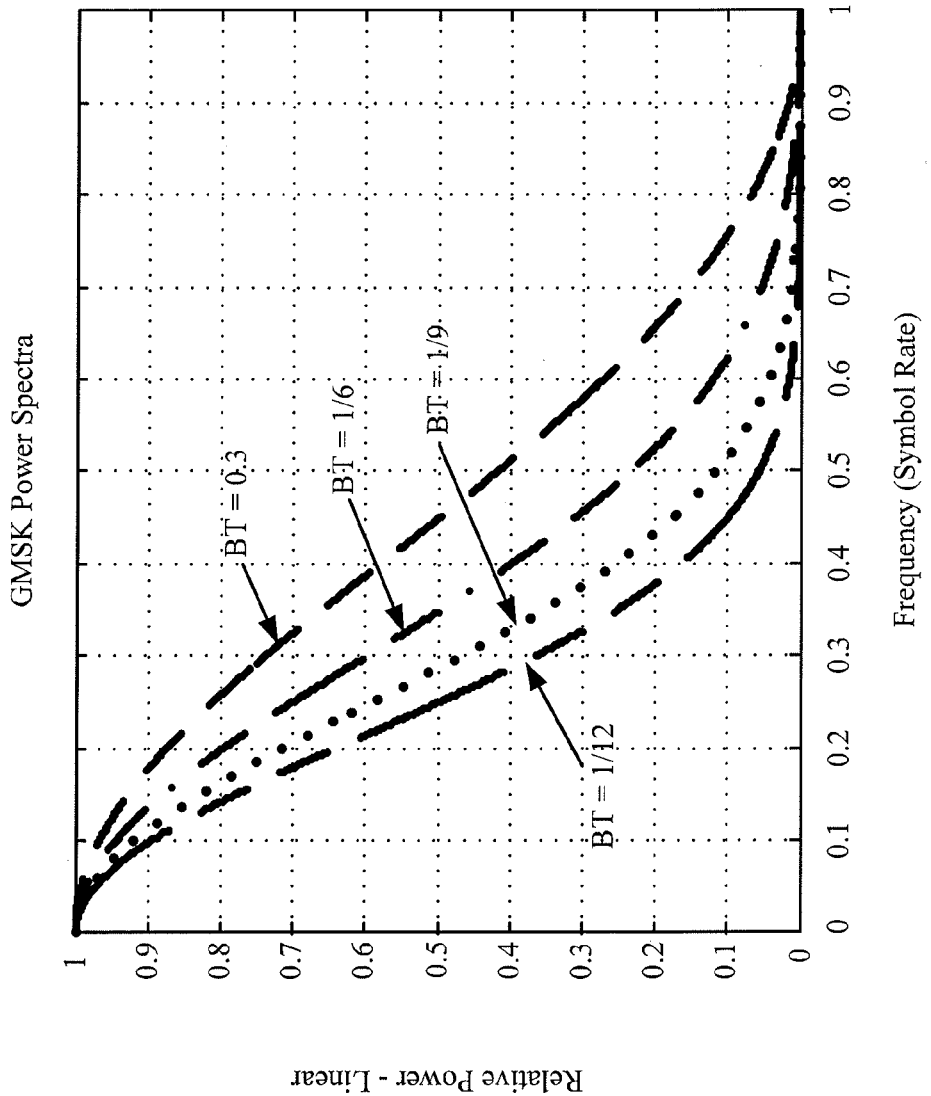
FIG. 7 is a schematic illustration of a graph that is useful for understanding GMSK power spectra.

FIG. 1 shows the various processing functions associated with the modem 100 in block diagram form. These processing functions can be implemented in hardware, in software, or in a combination of hardware and software. In hardware/software embodiments of the present invention, one or more of the functional blocks 102-114 shown in FIG. 1 can be implemented in a system (e.g., system 600 shown in FIG. 6) using at least one processor (602 shown in FIG. 6) and a memory (604 shown in FIG. 6) with instructions (606 shown in FIG. 6) stored therein for causing the processor to perform one or more functions (e.g., functions 102-114) of the modem 100. Processors and memories are well known in the art, and therefore will not be described herein.

In FIG. 1, thin lines represent real values and thick lines represent complex values. Cross hatched lines represent vectors with the number next to the cross hatch giving the vector length.

As shown in FIG. 1, time synchronized complex data is provided at an input of the modem 100. For purposes of the present disclosure, a burst type communication system is assumed. However, the invention is not limited in this regard. The present invention can be used in non-burst type communication systems. The time synchronized complex data can be a baseband signal derived from an RF transmission received by a communication receiver (not shown). For example, the RF signal can be down-converted from RF to baseband before being presented to the modem 100. The time synchronized complex input data is assumed to be GMSK sampled at the symbol rate. The complex input data is further assumed to be time synchronized using a synchronization convention. As will be readily appreciated by those skilled in the art, the details of the time synchronization method will depend on the particular communications system. Accordingly, the synchronization method is beyond the scope of this disclosure.

Referring once again to FIG. 1, the time synchronized complex data is communicated serially to functions represented by a matched filter block 102, a Phase Correct and Rotate (PCR) block 104, and a Scale and Delay (SD) block 106 as shown. The matched filter block 102 is provided to maximize Signal to Noise Ratio (SNR) of the incoming time synchronized complex data signal. In this regard, the matched filter block 102 is advantageously selected to match a pulse shaping filter at the transmitter (not shown) which originated the time synchronized complex data signal. Matched filters are well known in the art, and therefore will not be described here in detail. However, the matched filter block 102 is preferably selected to comprise a Finite Impulse Response (FIR) type of digital filter having four (4) taps. If there is one (1) sample per symbol, then the taps cover four (4) symbols. If the sampling is at a higher rate than one (1) sample per symbol, then more taps are proportionally required. For BT values of three tenths (BT=0.3) or lower (BT<0.3), one (1) sample per symbol satisfies the Nyquist criteria. The matched filter could be selected to have additional taps, but such taps are not necessary provided that the data is sampled at the Nyquist rate.

The output of the matched filter block 102 is comprised of both In-phase (I) and Quadrature (Q) data (referred to hereinafter as "I, Q data"). For each data sample, the I, Q data provides a complex representation of the signal amplitude and phase. Further, it should be understood that the output of the matched filter block 102 represents the sum of several filtered Laurent pulses, each associated with a different PAM signal and with a different symbol time index. For example, for a BT value equal to one sixth (BT=⅙), the GMSK signal can be represented by the sum of four (4) PAM signals. Each of the four (4) PAM signals is defined by different Laurent pulse shapes and different relative time delays. Each of the four (4) PAM signals is also defined by a different series of transmit symbols, where the transmit symbols are from the set [1, i, −1, −i]. For a BT value equal to one sixth (BT=⅙), the output of the matched filter block 102, at a particular time index n, is the sum of the filter output for the first Laurent pulse multiplied by the $n^{th}$ transmit symbol of the first PAM signal, plus the filter output for the second Laurent pulse multiplied by the $(n-1)^{th}$ transmit symbol of the second PAM signal, plus the filter output for the third Laurent pulse multiplied by the $(n-1)^{th}$ transmit symbol of the third PAM signal, plus the filter output for the fourth ($4^{th}$) Laurent pulse multiplied by the $(n-2)^{th}$ transmit symbol of the fourth ($4^{th}$) PAM signal. The whole sum is offset by some random RF phase.

After being processed in the matched filter block 102, the complex data signal is passed to the PCR block 104, which performs two (2) functions, namely a phase correction function and a phase rotation function. The phase correction function simply involves rotating the complex data signal through some phase angle to correct for phase variations introduced by the communication channel in the time synchronized complex data. A phase offset correction signal is provided for this purpose to control the phase correction function. Any conventional phase offset correction method can be used for this purpose. The details of generating the RF phase correction estimate will depend on the particular communications system and are beyond the scope of this invention. Accordingly, such detail will not be included here.

The PCR block 104 also performs a one forth (¼) symbol rate phase rotation. As will be explained in further detail below, this one fourth (¼) symbol rate phase rotation is required to strip the GMSK modulation from the data. In general, this step involves multiplying each sample by $i^{-n}$, where n represents the sample number associated with each sample. After the one fourth (¼) symbol rate phase rotation is performed, the real part of the rotated data is included at the output of the PCR block 104. The imaginary part of the data can be discarded at this point.

The real part of the rotated data is communicated to the SD block 106, which performs a scaling and delaying function. It may be recalled that four (4) Laurent terms are generally needed when BT values equal one sixth (BT=⅙) in order to adequately represent the GMSK signal. Additional Laurent terms may be needed for BT values less than one sixth (BT<⅙). For purposes of SD block 106, it is assumed that the pulses for the second, third, and fourth terms of the Laurent expansion can be represented as scaled and delayed versions of the pulse used in the first term of the Laurent expansion, thereby greatly simplifying subsequent processing.

In SD block 106, the data undergoes four (4) different real value scaling and corresponding integer symbol delays. This generates a real vector comprised of four (4) elements. Note that because of the differing delays, the members of a particular four (4) element vector will each be associated with a different input time sample. The scale and delay function performed by SD block 106 will produce a total of N+3 four (4) element vectors, where N is the number of data symbols in a burst. In effect, a single input data pulse is scaled and delayed to generate approximations of filtering by the pulses used in the terms of the Laurent expansion. The approximations of filtering are defined by mathematical equation (28) provided below. Notably, mathematical equation (28) is an approximation for mathematical equation (27). Each of these four pulses 201, 202, 203, 204 are shown overlaid upon one another in FIG. 2. Notably, the four pulses 201, 202, 203, 204 are shown with the appropriate time delays.

An explanation regarding how the scaling and delaying values are determined for the scale/delay function is provided below. However, it should be understood that the objective, for each Laurent pulse, is to find a version of the first Laurent pulse, that when delayed and scaled, minimizes the integrated squared error between the transformed version of the first Laurent pulse and the target Laurent pulse. The delays are limited to integer multiples of the symbol rate.

After the four (4) element vectors are calculated in SD block 106, they are communicated to a buffer 107. The buffer 107 stores the N+3 four (4) element vectors and, when triggered, delivers these vectors sequentially to the trellis equalizer 108. More particularly, the buffer 107 sequentially provides one (1) element of the four (4) element vectors to the trellis equalizer 108 during each data symbol processed by the trellis equalizer 108. For a given burst, a total of N+3 such four (4) element vectors are processed for each iteration of turbo processing.

The trellis equalizer 108 is implemented as a Soft Decision Viterbi Equalizer (SDVE), but uses unique trellis transition metrics in a manner that is unlike conventional GMSK demodulator designs, such as is described in the Abbey Rhodes paper. An exemplary SDVE algorithm is described in the following paper: W. Koch, A Baier, "Optimum and Sub-Optimum Detection of Coded Data Distributed By Time Varying Inter-Symbol Interference", *IEEE Global Conference on Telecommunications*, 1990, vol. 3, pp. 1679-1684. More particularly, the present invention uses one (1) set of transition metrics for both odd and even data bit processing. A reduction in processing hardware is provided in the present invention as a result of using real rather than complex data. A reduction in processing hardware is also provided as a result of performing uniform processing for odd and even symbols. For each state, the trellis equalizer block 108 only needs to store one (1) metric, and does not need to track any information concerning previous bits. Notably, the implementation of turbo equalization is made relatively simple because the trellis of the present invention is in terms of data symbols rather than transmit symbols.

The trellis equalizer block 108 receives as input one (1) vector of length N from a block 116, which performs a subtraction operation using vectors from a buffer block 118 and the De-interleave, De-code, and Re-interleave (DDR) block 112. As noted above, N is the number of data symbols in a burst. Each vector of length N from each block 112, 118 contains the relative log likelihood ratios for N symbols in the burst. The length N vector is delivered sequentially once per iteration of the turbo processing. Initially, for the first iteration, all of the values in the vector are set to zero (0). Those skilled in the art will appreciate that a relative log likelihood ratio may be an integer value or a non-integer value representing how likely it is that a bit has a value of zero (0) or one (1). Thus, the length N vector is comprised of a set of N integer values, each representing how likely it is that one (1) of the N data symbols in a particular burst is a zero (0) or a one (1).

Referring once again to FIG. 1, the trellis equalizer block 108 generates three (3) sets of real valued vector outputs. One of these vectors, labeled 'Metrics' in FIG. 1, is the relative log likelihood ratio for each of the eight (8) trellis states. These values are fed back into the trellis equalizer block 108 through unit bit delay 114. The trellis equalizer block 108 also outputs a length sixteen (16) vector that is the sixteen (16) branch metrics that are calculated for each input in an eight (8) state trellis. This vector is labeled 'Y' in FIG. 1. The trellis equalizer block 108 also outputs a length four (4) vector whose elements all have a value of either positive one (+1) or negative one (−1). This vector is labeled 'Z' in FIG. 1. The origin and purpose of this vector Z is discussed in further detail below. The generation of each of these three (3) sets of vectors is repeated, in a sequential manor, N+3 times for each iteration of the turbo process.

The N+3 'Y' and 'Z' vectors are communicated sequentially to a Soft Bit Decision (SBD) block 110 during an iteration of the turbo processing. The SBD block 110 also receives as input one (1) vector of length N from a Turbo Iteration Delay (TID) block 120. This vector of length N is delivered sequentially once per iteration of the turbo process. Initially, for the first iteration, all of the values in the vector are set to zero (0).

The SBD block 110 sequentially outputs N real vales once per iteration of the turbo processing. These outputs are the log likelihood ratios for each of the N data symbols in the burst. These outputs are buffered in DDR block 112. For every iteration of the turbo processing, the DDR block 112 de-interleaves the input values, performs soft decision decoding, generates log likelihood ratios for each input symbol, and re-interleaves these ratio values. The calculated output log likelihood ratios are extrinsic (to whatever extent possible given the particular decoder) to the input log likelihood ratios.

The term "extrinsic", as used here, means that the log likelihood ratio output by a decoder, for feedback to an equalizer, does not depend on the log likelihood ratio input into the decoder, from the equalizer, for that given data symbol. Instead the "extrinsic" log likelihood ratio output, for a given data symbol, is calculated based only on the input log likelihood ratios, from an equalizer, for all other data symbols except the given data symbol. The operations performed by blocks 116 facilitate the implementation of the "extrinsic" feature of the present invention. As noted above, blocks 116 generally subtracts a soft output of an equalizer (e.g., blocks 108, 110) from a soft output of a decoder (e.g., DDR bock 112). The details of the de-interleave and decode operations performed by DDR block 112 are dependent on the particular communication system. However, such operations are well known to those skilled in the art, and therefore will not be discussed here. Once per burst, after the final iteration of the turbo processing, DDR block 112 outputs N/R data bits, where R is the coding rate.

Detailed Derivation of Demodulator/Equalizer Algorithm

Figure 2:
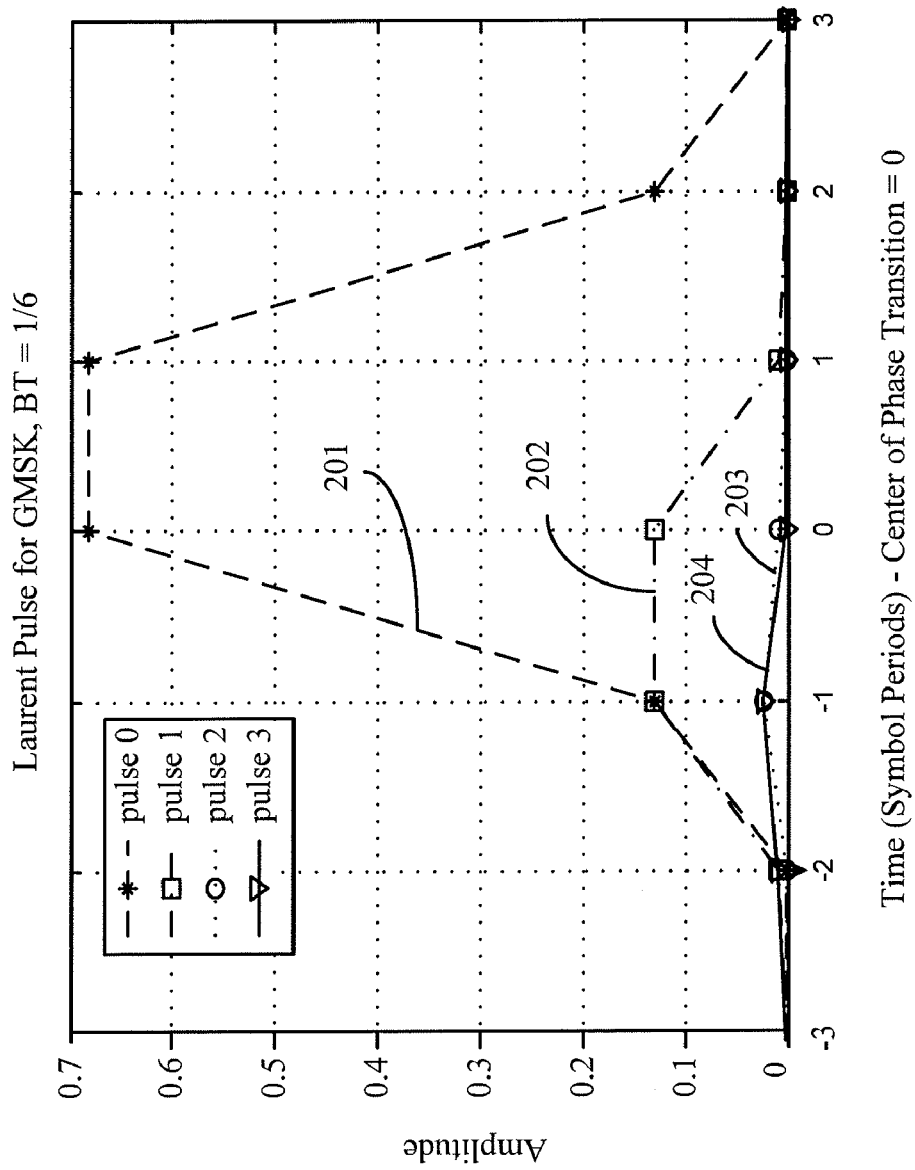
FIG. 2 is a drawing which is useful for understanding the relationship between a plurality of pulses representing a GMSK signal in a Laurent expansion.

Prior to discussing the various functions of modem 100 in more detail, it is useful to consider a derivation which explains the implementation of the modem 100 in greater detail. Turning now to FIG. 2, there is illustrated an approximation to the GMSK waveform that is derived in terms of PAM pulses. The approximation to the GMSK waveform is defined below by mathematical equation (9).

$$s(t, \alpha) \approx \sum_{k=0}^{N} \sum_{n} b_{k,n} c_k(t - nT) \quad (9)$$

where the value of N is based on the desired accuracy, and where $b_{k,n}$ is defined by the following mathematical equation (10).

$$b_{k,n} = \exp\left(i\frac{\pi}{2}\left[\sum_{m=-\infty}^{n} \alpha_m - \sum_{i=0}^{L-1} \alpha_{n-i}\beta_{k,i}\right]\right) \quad (10)$$

where $\alpha_n$ is defined by the following mathematical equation (11).

$$\alpha_n = d_n d_{n-1} \quad (11)$$

where the $d_n$ are the input data symbols expressed as positive or negative one (±1). The coefficients $\beta_{k,i}$, in mathematical equation (10), are either zeros (0) or ones (1), with $\beta_{k,0}$ always equal to zero (0), and with the rest of the $\beta_{k,i}$ determined by the following mathematical equation (12).

$$k = \sum_{i=1}^{L-1} 2^{i-1}\beta_{k,i} \quad 0 \le k \le 2^L - 1 \quad (12)$$

where L is chosen large enough to satisfy $$\int_{-L/2}^{-L/2} g(t) \approx 1 \quad (13)$$

where g(t) is the GMSK Gaussian function convolved with a square pulse with width equal to the symbol period.

The PAM pulses, $c_k(t)$ in mathematical equation (9), are given by the following mathematical equation (14).

$$c_k(t) = \prod_{i=1}^{L-1} u(t + iT + \beta_{k,i} LT) \tag{14}$$

where u(t) is defined by the following mathematical equation (15).

$$u(t) = \begin{cases} \sin(\frac{\pi}{2} q(t)), & -\frac{L}{2} \le t \le \frac{L}{2} \\ u(L-t), & \frac{L}{2} < t \le \frac{3L}{2} \\ 0, & \text{elsewhere} \end{cases} \tag{15}$$

where q(t) is defined by the following mathematical equation (16).

$$q(t) = \int_{-\infty}^{t} g(\tau) d\tau \tag{16}$$

Arbitrarily, we define the sample of the first symbol, assuming perfect time synchronization, to occur at t=0. Given this, and using mathematical equations (13)-(15), the first four (4) PAM pulses for a GMSK waveform with BT equal to one sixth (BT=⅙), are plotted in FIG. 2 for a sample rate equal to the symbol rate.

Figure 4:
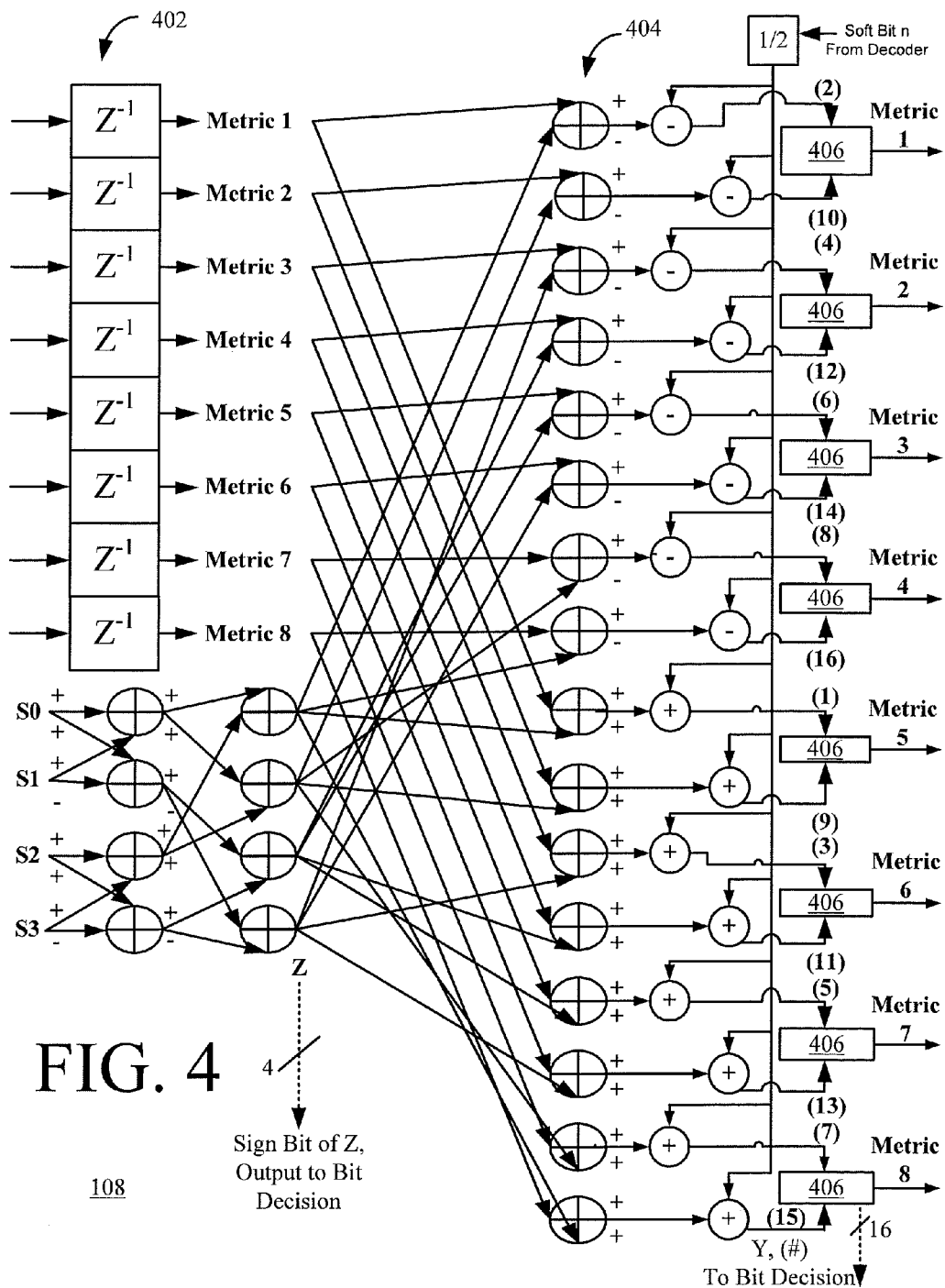
FIG. 4 is a detailed block diagram showing the trellis equalizer block in FIG. 1.

Given the mathematical equations for $b_{k,n}$ and the realizations of the PAM pulses $c_k(t)$, the GMSK waveform can be demodulated using a Maximum Likelihood Sequence Estimation (MLSE) process as discussed in the following paper: G. Ungerboeck, "Adaptive maximum likelihood receiver for carrier modulated data transmission systems", *IEE Trans on Commun.*, vol. COM-22, pp. 624-635, 1974. That process is based on the input data filtered with the PAM pulses $c_k(t)$. The MLSE process can be described directly in terms of $b_{k,n}$ where the state transition metric at a given sample "n" is given by the following mathematical equation (17).

$$\lambda_n = \sum_{k=0}^{N-1} \text{Re}(r_{k,n} b_{k,n}^*) \tag{17}$$

where $r_{k,n}$ are the outputs of the sampled data convolved with the time reversed samples of the pulses $c_k(t)$, where the first four (4) pulses $c_k(t)$ are plotted in FIG. 4, where the time synchronization described above is assumed. The basis for this representation is described in more detail in the following paper: D. D. Abbey, R. R. Rhodes, "A simple coherent receiver for frequency-hopped pulse-driven GMSK", IEEE 0-7803-5538-5/99, pp. 286-290, 1999. This leads to a complex valued MLSE with different state transition equations for odd and even states. Id. For implementation simplicity, it is desirable to develop a real valued MLSE expressed directly in terms of the data symbols $d_n$, where all samples in the MLSE are processed in exactly the same way. This can be done by de-rotating the input samples into the MLSE, or rewriting mathematical equation (17) as mathematical equation (18).

$$\lambda_n = \sum_{k=0}^{N-1} \text{Re}((Ci^{-n} r_{k,n})(Ci^{-n} b_{k,n})^*) = \sum_{k=0}^{N-1} \text{Re}((Ci^{-n} r_{k,n}) w_{k,n}^*(d)) \tag{18}$$

where $w_{k,n}^*(d)$ are coefficients that are functions of one or more of the data symbols $d_n$, and are derived from mathematical equations (10) and (11), with C, a constant, chosen so that $w_{0,0} = d_0$ where $d_0$ is the first data symbol to be demodulated.

Then, the following mathematical equation (19) can be derived from mathematical equations (10), (11), and (18).

$$C = d_0 \exp\left(-i\frac{\pi}{2} \sum_{m=-\infty}^{0} d_m d_{m-1}\right) \tag{19}$$

Also, the following mathematical equation (20) can be derived from mathematical equations (10), (11), (18), and (19).

$$w_{0,n} = i^{-n} d_0 \exp\left(i\frac{\pi}{2} \sum_{m=1}^{n} d_m d_{m-1}\right) \tag{20}$$

Then using the fact that $$\exp\left(i\frac{\pi}{2}(d_m d_{m-1} + d_{m-1} d_{m-2})\right) = -d_m d_{m-2}, \tag{21}$$

mathematical equation (20) can be rewritten as mathematical equation (22).

$$\begin{aligned} w_{0,n} &= i^{-n} d_0 (-1)^{\frac{n-1}{2}} d_1 d_n \exp\left(i\frac{\pi}{2} d_1 d_0\right) \\ &= d_n i^{-n} (-1)^{\frac{n-1}{2}} \exp\left(i\frac{\pi}{2}(d_1 d_0 + (1 - d_1 d_0))\right) \\ &= d_n, n \text{ odd} \\ &= i^{-n} d_0 (-1)^{\frac{n-1}{2}} d_0 d_n \\ &= d_n, n \text{ even} \end{aligned} \tag{22}$$

Then, the following mathematical equation (23) can be derived using mathematical equations (10), (11), (18), (19), and (20).

$$w_{1,n} = d_n \exp\left(-i\frac{\pi}{2} d_{n-1} d_{n-2}\right) = -i d_n d_{n-1} d_{n-2} \tag{23}$$

Similarly, the following mathematical equation (24) and (25) can be derived.

$$w_{2,n} = -i d_n d_{n-2} d_{n-3} \tag{24}$$

$$w_{3,n} = -d_n d_{n-1} d_{n-3} \tag{25}$$

Mathematical equations (22)-(25) specify an MLSE metric update for N=4 of the form shown below in mathematical equation (26)

$$\begin{aligned} \Lambda_n(\tilde{d}_n) = \Lambda_{n-1}(\tilde{d}_{n-1}) + \tilde{d}_n(y_{0,n} + y_{1,n} \tilde{d}_{n-1} \tilde{d}_{n-2} + y_{2,n} \tilde{d}_{n-2} \\ \tilde{d}_{n-3} + y_{3,n} \tilde{d}_{n-1} \tilde{d}_{n-3}) \end{aligned} \tag{26}$$

where $y_{k,n}$ is defined by the following mathematical equation (27).

$$y_{k,n} = Re(Ci^{-n+ceil(k/2)}r_{k,n})\, k=0,1,2,3 \quad (27)$$

where ceil(x) is a function that rounds the argument to the next highest integer. In mathematical equation (26), the $\tilde{d}_n$ are the postulated $d_n$ for a given trellis state, and the $\tilde{d}_n$ are vectors of length n, where the elements are the $\tilde{d}_m$, m=1 to n, for the MLSE trellis path of a given state. Because the last two (2) terms in mathematical equation (26) depend on $\tilde{d}_{n-3}$, the trellis for N=4, has $2^3$=8 states.

For the chosen algorithm, two (2) simplifications are made to the trellis processing described above. First, rather than using four (4) different FIR filters for four (4) different pulses $c_k(t)$, only one (1) FIR filter, using pulse $c_0(t)$, is performed, and the outputs are scaled and delayed to approximate the outputs that would be produced from FIR operations using the other three (3) pulses $c_k(t)$. This process is known in the art as described in the following paper: D. D. Abbey, R. R. Rhodes, "A simple coherent receiver for frequency-hopped pulse-driven GMSK", IEEE 0-7803-5538-5/99, pp. 286-290, 1999. Here the method used to choose the scaling and delay is the Least Squares Error (LSE) between the scaled and delayed version of the pulse $c_0(t)$ and the target pulse $c_k(t)$. Note that the least squares computed delays for the pulses $c_k(t)$ are [0 1 1 2], for k=[0 1 2 3]. Note from mathematical equations (22), (23), (24), and (25), that the coefficients on the right hand side of the mathematical equations, preceding the $d_n$, are $[1\ -i\ -i\ -1]=-i^\wedge[0\ 1\ 1\ 2]$ respectively, for the four (4) mathematical equations. Then using the least square approximation, mathematical equation (27) can be approximated as shown by the following mathematical equation (28).

$$y_{k,n} \approx Re(Ci^{-n+m(k)}v_k r_{n-m(k),0})\, k=0,1,2,3 \quad (28)$$

where m(k)=[0, 1, 1, 2], k=0, 1, 2, 3 and where $v_k$ are real, positive coefficients that are calculated from the LSE of the pulses $c_k(t)$ as scaled replicas of the pulse $c_0(t)$, with $v_0=1$ and $v_k<1$, for k>0.

The final simplification to trellis implementation, used here, is the elimination of the trellis memory and trellis look-back processing. In traditional MLSE implementations, bit decisions are delayed by at least five (5) times the channel length. Here the channel length is L, as defined for mathematical equation (13), and is at least five (5) symbols in length for a BT value of one sixth (BT=⅙).

Maintenance of the trellis memory requires, at the symbol rate, shuffling of an eight (8) row by (5×L) column memory matrix, as well as a bookkeeping method for tracing back through the trellis. However, if bit decisions are only delayed by log 2(# trellis states), or three (3), for an eight (8) state trellis, no trellis memory or trace back bookkeeping is required. See, for example, W. Koch, A Baier, "Optimum and Sub-Optimum Detection of Coded Data Distributed By Time Varying Inter-Symbol Interference", *IEEE Global Conference on Telecommunications,* 1990, vol. 3, pp. 1679-1684. This is accomplished by enumerating the states from lowest to highest, with the most recent symbol value taken as the most significant bit. The state with the highest metric, as defined in mathematical equation (26), is identified, as well as the predecessor state leading to the highest metric. If the predecessor state is odd, assuming the lowest state is numbered one (1), the output bit for the symbol occurring three (for an 8 state trellis) symbol periods previously is zero (0), else it is a one (1).

Detailed Explanation of Modem Blocks

Given the foregoing derivation of a demodulator/equalizer, the operation of the various blocks of modem 100 will now be discussed in more detail.

Figure 3:
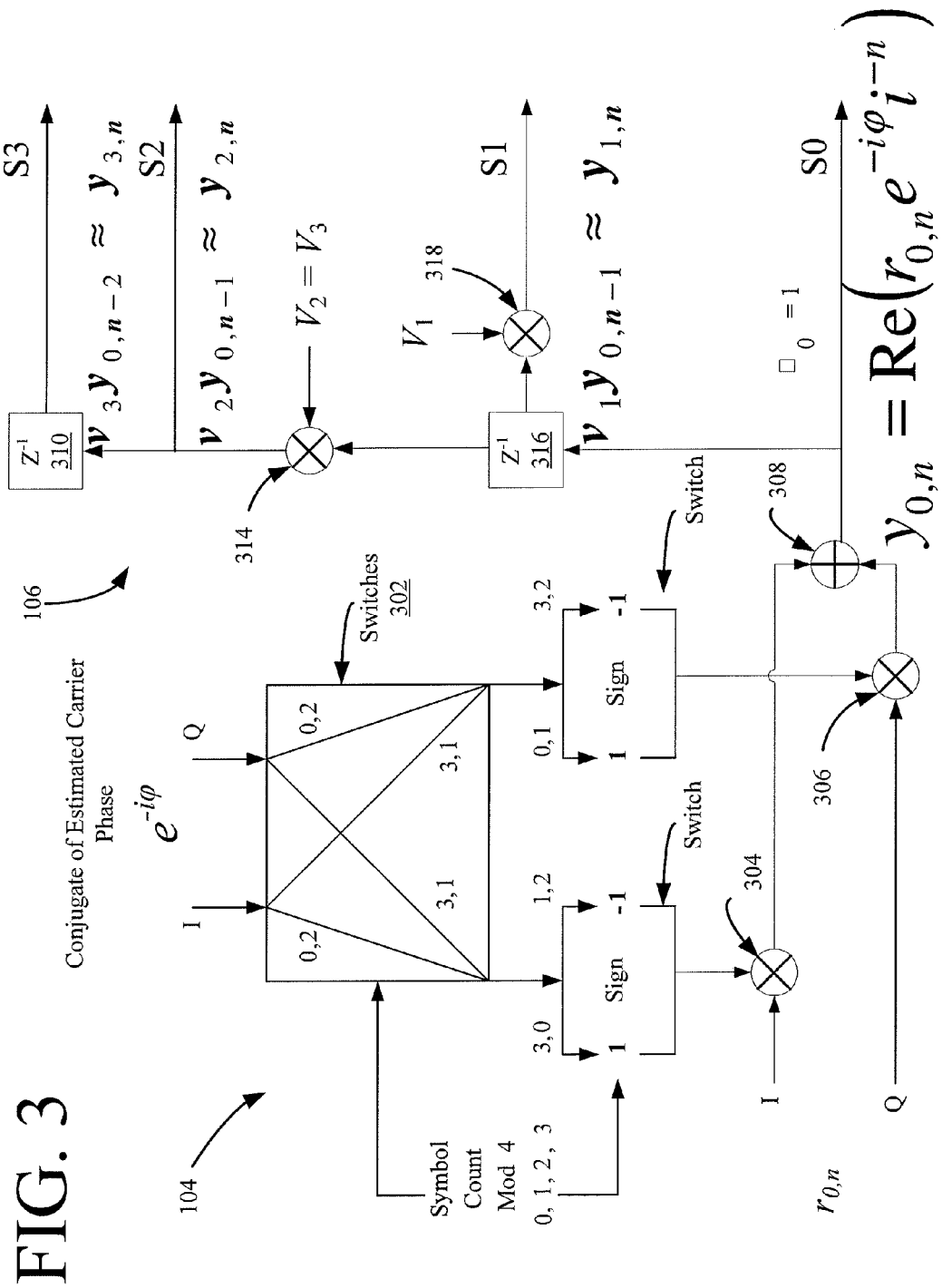
FIG. 3 is a detailed block diagram showing the phase correction and rotate block, and the scale and delay block, which are each shown in FIG. 1.

Referring now to FIG. 3, there is provided a detailed block diagram that depicts the phase correct and rotate function (block 104), on the left side of the figure. On the right side of FIG. 3, the scale and delay function (block 106) is shown. Together these two (2) functions implement the right side of mathematical equation (28) except for the multiplication by the constant C. The particular choice for the constant C will depend on the details of the particular communications system and is not dealt with here. The phase correct and rotate function in block 104 also implements an RF phase correction which is not addressed in mathematical equation (28).

Briefly, the phase correct and rotate block 104 implements the expression $Re(r_{0,n}e^{-i\Phi}i^{-1})$, where $r_{0,n}$ is the $n^{th}$ complex sample output from the four (4) tap matched filter 102 which has taps given by the curve labeled 201 in FIG. 2 and where $e^{i\Phi}$ is the random RF phase of the received signal. The taps of the match filter are given by the Y coordinate of the points indicated by the "*" symbols in curve 102.

Function 104 is depicted on the left side of FIG. 3 and includes the functions 302, 304, 306 and 308. The switch operations shown in FIG. 3 are used so that only the real part of the product $(r_{0,n}e^{i\Phi}i^{-n})$ is computed. Because only the real part is computed, the pairing between the I, Q components of $e^{-i\Phi}$ and the I, Q components of $r_{0,n}$ changes with n because of the $i^{-n}$ term. The sign of the product also changes with n due to the $i^{-n}$ term. The switch operations consist of two (2) parts. A first part (or the upper part as shown in FIG. 3) controls the pairing between I, Q components. A second part (or the lower part as shown in FIG. 3) controls the sign change of the product. The switching is driven by the symbol count, mod four (4), corresponding to the four (4) possible values for the $i^{-n}$ term.

The scale and delay function in block 106 accomplishes multiplication by the value $v_k$ in mathematical equation (28) as well as the integer delays m(k) for k=0, 1, 2, 3 in mathematical equation (28). More particularly, scaling values $v_1$, $v_2$ and $v_3$ are applied to each $r_{n,0}$ as shown in scaling nodes 314 and 318. Unit delays are applied in delay blocks 310 and 316. As shown in FIG. 3, for each complex input $r_{n,0}$ there are four (4) real outputs generated, namely S0, S1, S2 and S3. Notably, the real outputs S0, S1, S2 and S3 are the $y_{k,n}$, k=[0 1 2 3] values of mathematical equation (28).

FIG. 4 is a detailed block diagram showing the trellis equalizer block 108 of FIG. 1. The trellis equalizer block 108 performs the MLSE trellis update according to mathematical equation (26). In the embodiment shown, the trellis states are enumerated as values one (1) to eight (8) corresponding to base two (2) representations of the numbers zero (0) to seven (7), [0 0 0], [0 0 1], . . . , [1 1 0], [1 1 1], where the most significant (left) bit is the current bit and the least significant bit (right bit) is the bit occurring two bit periods before the current bit.

In the upper left hand corner of FIG. 4, the eight (8) variables listed as Metric1, Metric2, . . . , Metric 7, Metric8, are the predecessor state metrics $\Lambda_{n-1}(\tilde{d}_{n-1})$ in mathematical equation (26). In the lower left hand corner of FIG. 4, different combinations of sums and differences using S0, S1, S2, and S3 are computed to generate a four (4) element vector labeled Z. These four (4) values, to within a sign factor, are the four (4) possible values of $$\tilde{d}_n(y_{0,n}+y_{1,n}\tilde{d}_{n-1}\tilde{d}_{n-2}+y_{2,n}\tilde{d}_{n-2}\tilde{d}_{n-3}+y_{3,n}\tilde{d}_{n-1}\tilde{d}_{n-3})$$

in mathematical equation (26), as a function of $\tilde{d}_n$, $\tilde{d}_{n-1}$, $\tilde{d}_{n-2}$ and $\tilde{d}_{n-3}$. Note that based on the progression of the trellis there are a total of sixteen (16) different combinations of sums (404) of $$\Lambda_{n-1}(\tilde{d}_{n-1}) \text{ and } \tilde{d}_n(y_{0,n}+y_{1,n}\tilde{d}_{n-1}\tilde{d}_{n-2}+y_{2,n}\tilde{d}_{n-2}\tilde{d}_{n-3}+y_{3,n}\tilde{d}_{n-1}\tilde{d}_{n-3})$$

because each of the eight (8) predecessor states can map into two (2) different current states. To these sixteen (16) possible mappings, half (½) of an a priori log likelihood ratio, calculated in the decoder, is added or subtracted from each component depending on the bit value of the most significant bit of the target state associated with each component. If the most significant bit of the target state is zero (0), the value is subtracted, otherwise it is added. The resulting sixteen (16) element vector is labeled Y. The elements of Y are enumerated, using the format '(#)', above and below the block 406. Each current state has as its possible parent state, two (2) different components of the 'Y' vector. In block 406, the trellis equalizer block 108 chooses the largest value between these two (2) components. The resulting current metrics output from blocks 406 are then fed back, with one bit delay 402, to form the predecessor states for the next bit. Note that bit delay 402 in FIG. 4 corresponds to the bit delay block labeled as 114 in FIG. 1.

Figure 5:
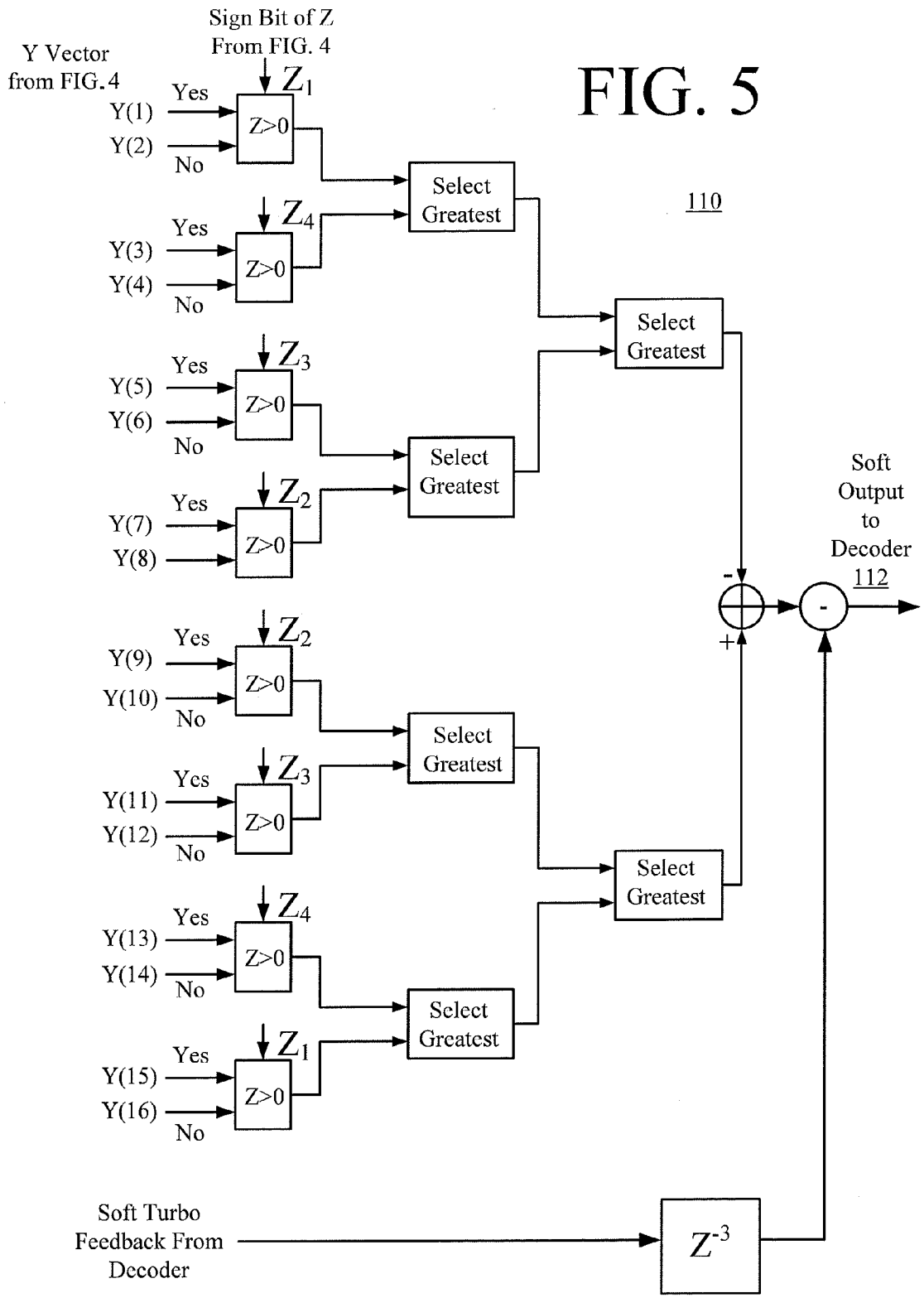
FIG. 5 is a detailed block diagram of the soft bit decision block in FIG. 1.

Referring now to FIG. 5, the transition metrics 'Y' from trellis equalizer block 108 shown in FIG. 4 are communicated to the SBD block 110. Further, the sign bit of 'Z' is communicated from the trellis equalizer block 108 in FIG. 4 to the SBD block 110. The SBD block 110 also receives soft turbo feedback values from the DDR block 112.

In FIG. 5, the SBD block 110 is based on arguments given in mathematical equation (12). The basic argument is that if the states are enumerated as described above, then for any trellis of size $2^m$ the transition metrics Y associated with odd predecessor states will correspond to a bit value of zero (0) at a position m bits previous to the current bit, while those associated with even predecessor states will correspond to a bit value of zero (1) at a position m bits previous.

The soft bit decision function pictured in FIG. 5 uses the approximation define by the following mathematical equation (29).

$$\log\left(\sum_n \exp(x_n)\right) \approx \max_n(x_n) \quad (29)$$

The bit decision made by the SBD block 110, assuming the trellis equalizer block 108 passed data based on processing the $n^{th}$ bit, is for the n−3 bit. Save for the approximation given by mathematical equation (29), the soft calculated bit decision is MAP for the n−3 bit under the constraint that only measurements from bits n−∞ to n are available. Note that the a priori value fed back from the DDR block 112 for the n−3 bit is subtracted out before the calculated soft bit is fed forward to the DDR block 112. This is done so that the soft bit information that is fed forward to the DDR block 112 is extrinsic to the information fed back from the DDR block 112.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

What is claimed is:

1. A method for demodulating a Gaussian Filtered Minimum Shift Keyed (GMSK) signal, comprising:
    receiving a Complex Data Signal (CDS) which can be represented as a Laurent expansion in which said CDS is approximated as a sum of linearly modulated pulses;
    filtering the CDS using a first matched filter having a filter shape corresponding to a first pulse used in a first term of said Laurent expansion;
    performing a phase rotation on data samples representing a first filtered complex output signal from said first matched filter to produce a −90 degree phase rotation for each complex data sample relative to a previous complex data sample;
    subsequent to the phase rotation, performing a scaling and delaying function exclusively on a real number portion of at least one of said complex data samples to obtain an approximation of at least a second filtered complex output signal that would be produced by a second matched filter having a filter shape corresponding to a second pulse used in a second term of said Laurent expansion.

2. The method according to claim 1, further comprising equalizing the CDS in a data symbol domain using the same transition metrics at each of a plurality of trellis transitions for both odd and even numbered data bits.

3. The method according to claim 1, further comprising performing said equalizing using a soft decision viterbi equalizer algorithm.

4. The method according to claim 1, further comprising selecting said first matched filter to have at least four taps.

5. The method according to claim 1, further comprising performing a time offset correction to said CDS.

6. The method according to claim 1, further comprising performing a phase offset correction to said CDS in addition to said phase rotation step.

7. A method for demodulating a Gaussian Filtered Minimum Shift Keyed (GMSK) signal, comprising:
    receiving said GMSK signal defined in a transmitted symbol domain where each symbol is given by a product of a current data bit and a previous data bit;
    converting said GMSK signal from said transmitted symbol domain to a data symbol domain by approximating a plurality of filtered complex output signals that would be produced by a plurality of matched filters having filter shapes corresponding to a predetermined number of pulses used in a plurality of terms of a Laurent expansion;
    performing a trellis equalization of said GMSK signal exclusively in the data symbol domain based on said plurality of terms of said Laurent expansion.

8. The method according to claim 7, wherein said converting step further comprises filtering said GMSK signal using a first matched filter having a filter shape corresponding to a first pulse used in a first term of said plurality of terms in said Laurent expansion.

9. The method according to claim 8, wherein said converting step further comprises performing a phase rotation on complex data samples representing a first complex output signal from said first matched filter to produce a −90 degree phase rotation for each data sample relative to a previous sample.

10. The method according to claim 9, wherein said converting step further comprises performing a scaling and delaying function exclusively on a real number portion of a complex data sample to obtain an approximation of at least a second filtered complex output signal that would be produced by a second matched filter having a filter shape corresponding to a second pulse used in a second term of said Laurent expansion.

11. The method according to claim 8, further comprising selecting said first matched filter to have at least four taps.

12. The method according to claim 7, wherein said trellis equalization uses the same trellis transition metrics at each of a plurality of trellis transitions for both odd and even numbered data bits.

13. The method according to claim 7, further comprising performing said trellis equalization using a soft decision viterbi equalizer algorithm.

14. The method according to claim 7, further comprising performing a time offset correction to said GMSK signal prior to said converting step.

15. A system, comprising:
a memory; and
at least one processor configured for
receiving a GMSK signal defined in a transmitted symbol domain where each symbol is given by a product of a current data bit and a previous data bit;
converting said GMSK signal from said transmitted symbol domain to a data symbol domain by approximating a plurality of filtered complex output signals that would be produced by a plurality of matched filters having filter shapes corresponding to a predetermined number of pulses used in a plurality of terms of a Laurent expansion;
performing a trellis equalization of said GMSK signal exclusively in the data symbol domain based on said plurality of terms of said Laurent expansion.

16. The system according to claim 15, wherein said processor converts said GMSK signal by performing a first matched filter operation using said GMSK signal, said first matched filter operation implementing a first matched filter having a filter shape corresponding to a first pulse used in a first term of said plurality of terms in said Laurent expansion.

17. The system according to claim 16, wherein said processor is further configured to perform a phase rotation on complex data samples representing a first complex output signal from said first matched filter to produce a −90 degree phase rotation for each data sample relative to a previous sample.

18. The system according to claim 17, wherein said processor is further configured to perform a scaling and delaying function exclusively on a real number portion of a complex data sample to obtain an approximation of at least a second filtered complex output signal that would be produced from a second matched filter having a filter shape corresponding to a second pulses used in a second term of said Laurent expansion.

19. The system according to claim 16, wherein said first matched filter has at least four taps.

20. The system according to claim 15, wherein said processor uses, during said trellis equalization, the same trellis transition metrics at each of a plurality of trellis transitions for both odd and even numbered data bits.

21. The system according to claim 15, wherein said processor uses a soft decision viterbi equalizer algorithm when performing said trellis equalization.

22. The system according to claim 15, wherein said processor is further configured to perform a time offset correction to said GMSK signal prior to converting said GMSK signal.

* * * * *